United States Patent
Mishkin (10) Patent No.: US 9,517,414 B2
(45) Date of Patent: Dec. 13, 2016

(54) ONLINE GAME CREATION USING DATA SETS

(71) Applicant: IXL Learning, San Mateo, CA (US)

(72) Inventor: Paul B. Mishkin, Palo Alto, CA (US)

(73) Assignee: IXL LEARNING, San Mateo, CA (US)

( * ) Notice: Subject to any disclaimer, the term of this patent is extended or adjusted under 35 U.S.C. 154(b) by 219 days.

(21) Appl. No.: 14/267,176

(22) Filed: May 1, 2014

(65) Prior Publication Data

US 2015/0314198 A1    Nov. 5, 2015

(51) Int. Cl.
   *A63F 9/00*      (2006.01)
   *A63F 13/60*     (2014.01)
   *G06F 3/0484*    (2013.01)
   *G09B 7/00*      (2006.01)

(52) U.S. Cl.
   CPC .......... *A63F 13/60* (2014.09); *G06F 3/04842* (2013.01); *G09B 7/00* (2013.01); *A63F 2300/8064* (2013.01)

(58) Field of Classification Search
   None
   See application file for complete search history.

(56) References Cited

U.S. PATENT DOCUMENTS

| | | | |
|---|---|---|---|
| 2009/0327723 A1* | 12/2009 | Yates | G06Q 10/06 713/168 |
| 2010/0146060 A1* | 6/2010 | Graham | A63F 13/10 709/206 |
| 2011/0256933 A1* | 10/2011 | Place | A63F 13/71 463/42 |
| 2012/0244950 A1* | 9/2012 | Braun | A63F 13/10 463/42 |
| 2013/0031643 A1* | 1/2013 | Rogel | G06F 21/10 726/29 |
| 2013/0090171 A1* | 4/2013 | Holton | A63F 13/63 463/42 |
| 2014/0094312 A1* | 4/2014 | Wouhaybi | A63F 3/00643 463/42 |
| 2014/0162776 A1* | 6/2014 | Lucas | A63F 13/10 463/31 |
| 2014/0228099 A1* | 8/2014 | Weinshanker | G07F 17/3293 463/25 |

* cited by examiner

*Primary Examiner* — Seng H Lim
(74) *Attorney, Agent, or Firm* — Park, Vaughan, Fleming & Dowler LLP; Chia-Hsin Suen (57) ABSTRACT

The disclosed embodiments provide a system that facilitates creation of an online game. During operation, the system obtains a data set and a game template for the online game. Next, the system enables a user to select one or more subsets of the data set for use with the game template. Finally, the system creates the online game from the game template and data from the one or more subsets without requiring manual input of the data into the game template by the user.

20 Claims, 6 Drawing Sheets

ONLINE GAME CREATION USING DATA SETS

BACKGROUND

1. Field

The disclosed embodiments relate to online games. More specifically, the disclosed embodiments relate to techniques for creating online games using data sets that are decoupled from the online games.

2. Related Art

Educational games may be developed to encourage and aid learning in a variety of subjects for both children and adults. For example, an educational game may allow a user to learn and/or memorize facts, spelling, and/or vocabulary; develop logical thinking and/or analytical skills; and/or practice typing, language comprehension, and/or listening to music. Such educational games are commonly available online to enable access to the educational games by a large number of users.

In addition, educational games may be customized to facilitate learning by players of the education games. For example, multiple games may be configured to help the players learn state names and state capitals. Such games may include matching games that prompt the players to match face-up or face-down "cards" containing state names and state capitals to one another, flash card games that show a value from one category (e.g., state names) on one side of a card and the corresponding value from the other category (e.g., state capitals) on the other side of the card, and/or word search games that have values from one category (e.g., state capitals) hidden in a grid of letters and values from the other category (e.g., state names) as clues to the hidden words.

However, online educational games are typically developed for use with specific sets of data. As a result, creation of an online educational game may require manual input of data used with the educational game and limit reuse of the data with other educational games. For example, a game creator may provide a set of country names and a set of capital city names during the creation of one or more online games that allow users to match countries with capital cities of the countries. The game creator and/or another game creator may then be required to re-enter the same information during the creation of another online game that prompts the users to identify both the continent on which a country is located and the country's capital city. Moreover, changes to the countries of the world and/or the capital cities of the countries may not be reflected in the online games unless the game creator individually updates the data sets of both online games with the changes.

Consequently, creation and update of online and/or educational games may be facilitated by mechanisms for improving and streamlining the use of data with the online and/or educational games.

SUMMARY

The disclosed embodiments provide a system that facilitates creation of an online game. During operation, the system obtains a data set and a game template for the online game. Next, the system enables a user to select one or more subsets of the data set for use with the game template. Finally, the system creates the online game from the game template and data from the one or more subsets without requiring manual input of the data into the game template by the user.

In some embodiments, obtaining the data set and the game template for the online game involves providing a set of data sets and a set of game templates to the user, and enabling the user to select the data set from the set of data sets and the game template from the set of game templates.

In some embodiments, the system also obtains one or more configuration options for the online game from the user, and includes the one or more configuration options in the online game.

In some embodiments, the one or more configuration options include a title, a formatting option, and/or a game play option.

In some embodiments, the system also obtains the data set from the user or one or more other users, and enables modification and copying of the data set by the user or the one or more other users.

In some embodiments, the data set is obtained through a user interface for editing a set of rows and a set of columns in the data set.

In some embodiments, the system also enables access to the online game by the user and one or more other users, and automatically propagates changes in the one or more columns to the online game without requiring further configuration of the online game by the user or the one or more other users.

In some embodiments, enabling access to the online game by the user and the one or more other users involves at least one of enabling playing of the online game by the user and the one or more other users, and providing a set of usage statistics for the online game.

In some embodiments, the set of usage statistics includes a time spent, a number of users, a popularity, a score, a ranking, a correct answer, and/or an incorrect answer.

In some embodiments, the data set is associated with at least one of:

(i) a set of rows and a set of columns;
    (ii) one or more keys and a set of values related to each key;
    (iii) a compound data format; and
    (iv) a relational model.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
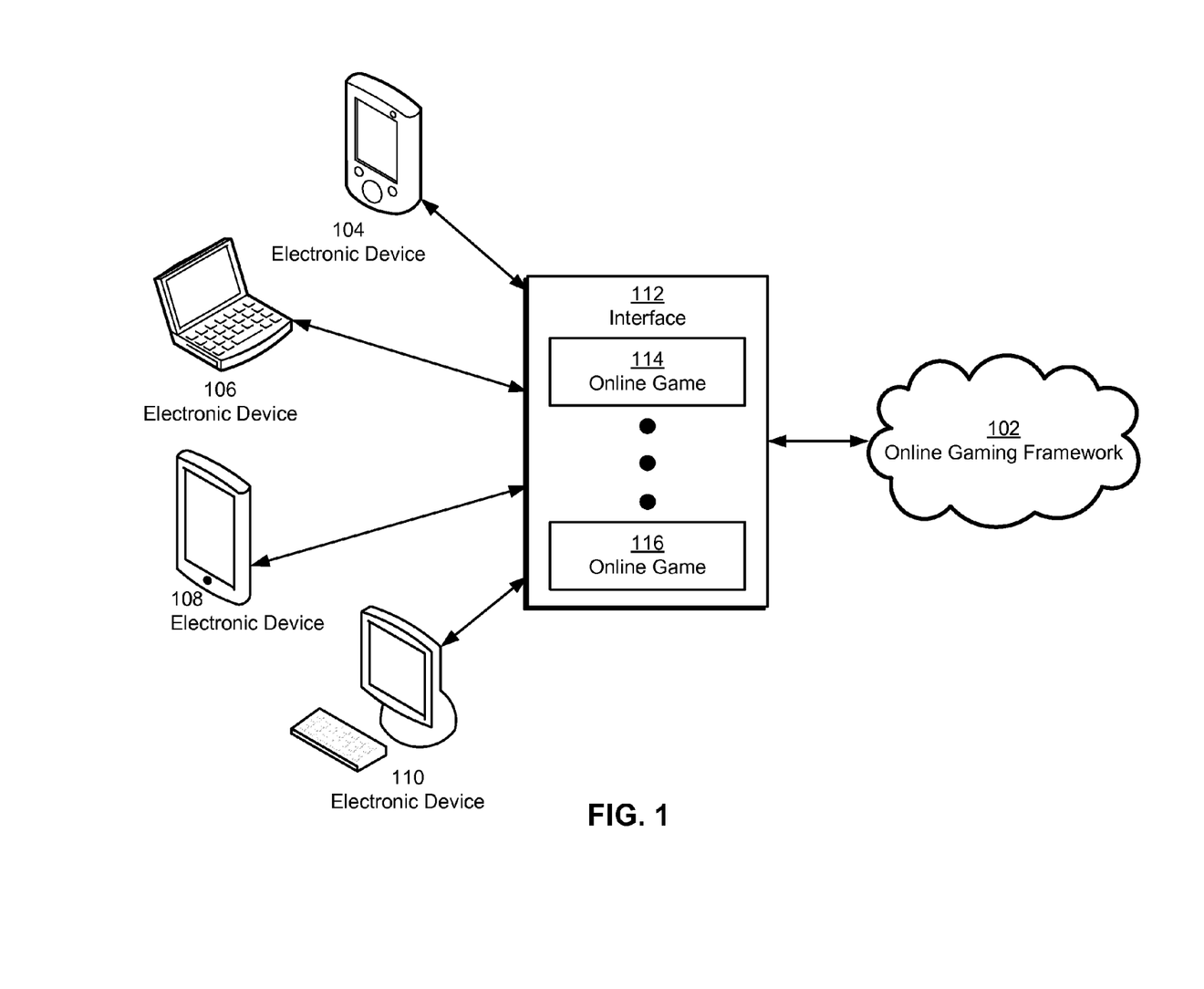
FIG. 1 shows a schematic of a system in accordance with the disclosed embodiments.

The disclosed embodiments provide a method and system for facilitating the creation of an online game. As shown in FIG. 1, a set of online games 114-116 may be provided by an interface 112 that is accessed by a set of users through a set of electronic devices 104-110. For example, interface 112 may be a graphical user interface (GUI), web-based user interface, touch-based user interface, and/or other type of user interface that is provided by a web browser, mobile application, native application, and/or other application executing on a mobile phone, personal computer, laptop computer, personal digital assistant, tablet computer, portable media player, and/or other type of network-enabled electronic device.

Online games 114-116 may be provided by an online gaming framework 102 that is accessed through interface 112. For example, online gaming framework 102 may show a set of available online games 114-116 in interface 112, and the users may select and play online games 114-116 by interacting with one or more input/output (I/O) devices of electronic devices 104-110. During playing of an online game, a user may use a keyboard, mouse, touchpad, touchscreen, game controller, joystick, and/or other input device to provide input through interface 112. The online game may process the input and use a display, speakers, and/or other output device to provide output to the user through interface 112.

Figure 2:
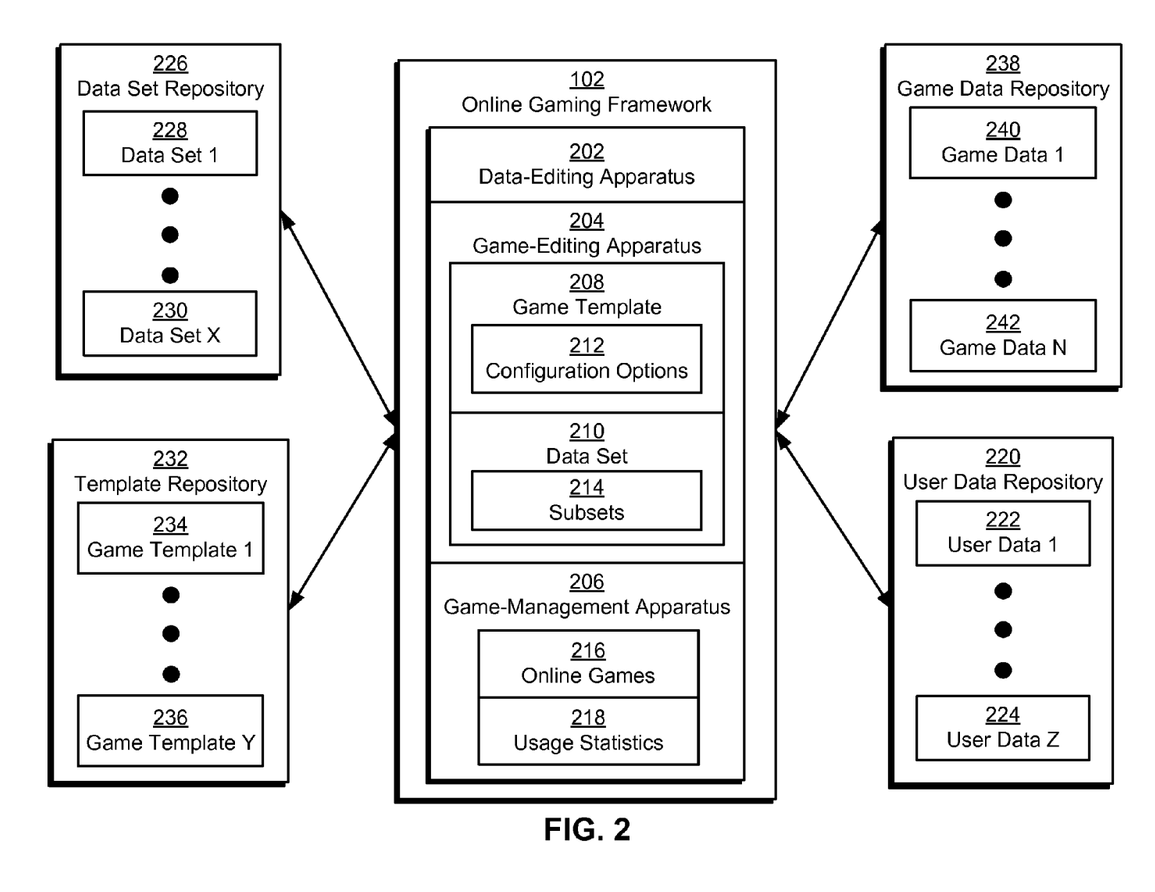
FIG. 2 shows a system for facilitating creation of an online game in accordance with the disclosed embodiments.

Online gaming framework 102 may also allow users to create online games 114-116. As shown in FIG. 2, online gaming framework 102 may maintain a set of game templates (e.g., game template 1 234, game template y 236) in a template repository 232. Each game template may be used to create a certain type of online game. For example, template repository 232 may include game templates for matching games that allow users to match related data elements, categorization games that allow users to categorize data elements, ordering games that allow users to order data elements by an attribute or characteristic, and/or identification games that allow users to identify and/or select data elements based on related data elements.

A user may create an online game by selecting a game template for the online game and providing the data to be used with the online game. For example, the user may create a matching game by selecting a game template for the matching game and manually inputting, uploading, or otherwise specifying two sets of data elements to be matched in the matching game. The user may then repeat the data-input process to create other online games, even if the online games utilize some or all of the same data. As a result, the user may expend significant time and effort in collecting, organizing, inputting, and/or updating data for use with individual online games (e.g., online games 216).

In one or more embodiments, online gaming framework 102 facilitates efficient organization, use, and/or reuse of data associated with online games 216 by enabling the creation and use of online games 216 with data sets (e.g., data set 1 228, data set x 230). Each data set may include data elements that adhere to an organization and/or format. For example, a data set may include a set of columns and a set of rows, with each column representing an attribute, item, and/or category and each row containing a value for the attribute, item, and/or category.

In addition, the data set may be created by one or more users using a data-editing apparatus 202 in online gaming framework 102. Continuing with the above example, the user(s) may input data elements into the rows and columns of the data set using a spreadsheet-style editor provided by data-editing apparatus 202. The editor may allow the user(s) to add and remove columns, add and remove rows, change the value of a data element and/or a column header, rearrange rows and columns, and/or perform other operations related to the rows and columns of the data set. The data elements may include alphanumeric text, non-alphanumeric characters (e.g., special symbols, Unicode scripts, etc.), images, audio, video, and/or other types of data.

After the data set is created, the data set may be saved to a data set repository 226 for subsequent retrieval and use. The user creating the data set may also modify the data set, save the modifications, and/or delete the data set. Another user may copy the data set as a different version of the data set and/or a new data set, which is also stored in data set repository 226 and is modifiable by the other user. Two or more users may also collaborate on a data set by creating individual copies of the data set and copying and/or propagating changes in each user's version of the data set to the other users' versions.

Consequently, data-editing apparatus 202 may facilitate creation, sharing, and update of data in the data sets while protecting the data sets from unauthorized modification. For example, data-editing apparatus 202 may allow a set of users to create a "family tree" of data sets containing related and/or overlapping data, with data in each data set based on and/or adding to data from an existing data set and/or a previous version of the data set.

Data sets in data set repository 226 may then be used to create online games 216. In particular, a game-editing apparatus 204 in online gaming framework 102 may provide the data sets from data set repository 226 and/or game templates from template repository 232 to a user and allow the user to select a game template 208 and/or a data set 210 for use in creating an online game. For example, game-editing apparatus 204 may display a first list of game templates to the user and allow the user to select game template 208 from the first list. Game-editing apparatus 204 may then display a second list of data sets to the user and allow the user to select data set 210 from the second list. Alternatively, game-editing apparatus 204 may obtain a default data set 210 from data-editing apparatus 202 (e.g., during creation and/or modification of data set 210 using data-editing apparatus 202) and allow the user to specify game template 208 for use with the default data set 210.

Next, game-editing apparatus 204 may allow the user to select one or more subsets 214 of data set 210 for use with game template 208. For example, subsets 214 may be selected as one or more columns of a "spreadsheet-style" data set. Game-editing apparatus 204 may display the column headers and some or all of the rows of data set 210 to the user, and the user may select a column representing an item and one or more columns representing attributes of the item to be used with the online game.

In one or more embodiments, game template 208 includes a set of rules that describe the types and/or number of subsets 214 that can be used with the online game. For example, game template 208 may limit subsets 214 of row-by-column data to one column for an item and one column for an attribute of the item if game template 208 is for a one-to-one matching game. Alternatively, game template 208 may allow the user to select multiple columns of attributes if the matching game is designed to allow a user to match an item to a random attribute and/or a set of attributes that are introduced sequentially in the matching game. If game template 208 is for an ordering game, game template 208 may require the user to specify a column of attributes that can be ordered. If game template 208 is for a categorization game, game template 208 may require the user to specify a column of attributes with fewer than a pre-specified number of unique values.

To facilitate selection of subsets 214, game-editing apparatus 204 may identify one or more subsets that are eligible or not eligible for use with game template 208. For example, game-editing apparatus 204 may highlight eligible columns and gray out ineligible columns in row-by-column data. Game-editing apparatus 204 may also recommend columns that work best with game template 208 by, for example, displaying a symbol (e.g., asterisk, star, etc.) next to the columns.

Game-editing apparatus 204 may also allow the user to provide one or more configuration options 212 associated with game template 208. Configuration options 212 may be used to customize the appearance and/or behavior of the online game. For example, configuration options 212 may include a title, a formatting option (e.g., board size, layout, color, font, background, etc.), and/or a game play option (e.g., game play speed, number of tries, number of rounds to play, etc.). Configuration options 212 may also be associated with default values to facilitate creation of the online game by a newer and/or novice user. Game-editing apparatus 204 may then include configuration options 212, subsets 214, game template 208, and/or data set 210 in game data (e.g., game data 1 240, game data n 242) for the online game and store the game data in a game data repository 238.

Game-editing apparatus 204 may further allow the user to specify one or more functions for modifying data in subsets 214 before the data is used in the online game. For example, the user may create a function that concatenates data from two different columns with static text to create a string that can be displayed in the online game in lieu of separate pieces of data from the columns. Similarly, the user may create a function that groups numeric data from a column into ranges that can be used in the online game. Finally, the user may create a function that limits the rows of data set 210 to be used in the online game based on the values of one or more attributes in the rows. To maintain the separation of the online game from the data set, such functions may be stored with game data for the online game in game data repository 238 instead of data set 210 in data set repository 226. In turn, the functions may provide game-specific customization of data from data set 210 without increasing the size and/or complexity of data set 210.

Those skilled in the art will appreciate that other data formats may be used with data sets used to create online games 216. Such data formats may include lists of related values associated with keys, such as the following mapping of alphabetic letters to country names:

V→Vanuatu, Vatican City, Venezuela, Vietnam
Y→Yemen
Z→Zambia, Zimbabwe

Another use of the key-and-values format may include the mapping of city names to professional sports teams:

Chicago→Bears, White Sox, Cubs, Bulls, Blackhawks
Orlando→Magic
Miami→Dolphins, Marlins, Heat, Panthers
Indianapolis→Colts, Pacers Games that utilize the above format may include, for example, a game that provides a key (e.g., "Z") and prompts a user to enter all values associated with the key (e.g., "Zambia," "Zimbabwe") within a pre-specified period (e.g., 30 seconds). In another example, the game may show one value (e.g., "Vietnam") and prompt the user to fill in the other values associated with the same key (e.g., "Vatican City," "Venezuela," "Vanuatu"). In a third example, the game may provide a key (e.g., "V") and prompt the user to identify the number of values (e.g., 4) associated with the key. The user may receive full credit for the correct number and partial credit for answers that are close to the correct number (e.g., 3 or 5).

The system of FIG. 2 may also support a "compound" data format containing two or more parts. One or more of the parts may be in a "spreadsheet-style" (e.g., row-and-column) format and/or a key-and-values list. An exemplary data set utilizing the compound data format may include a collection of images and a set of rows and columns, in which each row references one of the images and provides an (x, y) coordinate pair:

New York, USA_map, (381, 117)
San Francisco, USA_map, (107, 144)
Miami, USA_map, (344, 220)
Toronto, Canada_map, (304, 202)
Vancouver, Canada_map, (175, 176)

In the exemplary data set, each row provides a city name, references one of two images (e.g., "USA_map" or "Canada_map"), and specifies the pixel coordinates of the corresponding city on the referenced image (e.g., map). The data set may then be used as the basis for a geography game that displays a map and a city name and prompts the user to click and/or select the corresponding location on the map. User selections that are within a certain number of pixels from the correct location may be given full or partial credit.

The compound data format may also be used with variable-length lists of coordinates. An exemplary data set that utilizes variable-length coordinate lists may include the following:

Colorado, USA_map, {(179, 144), (179, 115), (220, 115), (220, 144)}
Utah, USA_map, {(151, 144), (151, 108), (168, 108), (168, 115), (179, 115), (179, 144)}

In the above data set, a state name is followed by the image containing the state and a set of pixel coordinates representing the state's outline, with more complex state outlines represented by longer lists. For example, a state such as California may be associated with a long list of coordinate pairs, while a roughly rectangular state such as Colorado may require only four coordinate pairs.

The compound data format may also be used with non-geography-related games. For example, the compound data format may be used in a medical game that displays an image related to human anatomy and the name of an anatomical structure and prompt the user to identify the location of the anatomical structure within the image. As a result, the data set for the medical game may have an image collection of images named "human_heart" or "human_kidney" and the following associated data:

left ventricle, human_heart, {(429, 506), (327, 371), (350, 311), (424, 299), (453, 417)}
    pulmonary vein, human_heart, {(331, 200), (485, 189), (509, 281), (446, 292), (374, 205), (326, 207)}
    renal artery, human_kidney, {(313, 172), (259, 197), (256, 190), (267, 174), (311, 163)}

In other words, the coordinate pairs in the above data set may represent rough outlines of the corresponding anatomical structures in the specified images.

An additional use of the compound data format may be for teaching vocabulary. Images may include scenes of a classroom, farm, office, and/or other locales, and users may be prompted to identify the locations of objects in the locales. For example, a game for learning Spanish may display an image of a classroom and the word "lapiz" to prompt the user to select a pencil within the image. The game may also show an image of a farm and the word "vaca" to prompt the user to select a cow within the image.

Finally, data in the data sets may be stored using a relational model (e.g., for a relational database). An exemplary data set using the relational model may store data related to Spanish vocabulary using the following:

1. "Verb" table
    Columns: primary key, infinitive, English meaning, gerund, participle, regularity
    Example data:
        1, bailar, to dance, bailando, bailado, regular
        2, estar, to be, estando, estado, irregular
2. "Subject" table
    Columns: primary key, subject, meaning
    Example data:
        1, yo, I
        2, tú, you
        3, el, he
        4, ella, she
3. "Tense" table
    Columns: primary key, tense in Spanish, tense in English
    Example data:
        1, presente, present
        2, futuro simple, simple future
        3, condicional, conditional
        4, preterito, simple past
4. "Conjugations" table: contains one row for every combination of values from the Verb, Subject, and Tense tables, referencing them by their keys.
    Columns: primary key, verb key, subject key, tense key, conjugated form
    Example data:
        {primary key}, 1, 3, 4, bailó

A game that uses the relational model data format above may provide the user with a randomly selected collection of values from the "Verb," "Subject," and "Tense" tables, such as ("bailar," "tú," "future"), and prompt the user to type the correct conjugation (e.g., "bailarás"). To set up the game, the creator may specify the tables and columns containing the answers, along with how the foreign keys for each of the clues are to be used. For example:

Answers coming from: Conjugations table→conjugated form
    Clue 1: Verb table (Conjugations table→verb key)→infinitive
    Clue 2: Subject table (Conjugations table→subject key)→subject
    Clue 3: Tense table (Conjugations table→tense key)→tense in English Another game that uses the relational model data format above may give the user a value and prompt the user to select the correct meaning of the value's foreign key. For example, the user may be provided with "bailarás" and three random verb tenses, such as "present," "conditional," and "simple future." The player may then receive points for choosing the correct answer, or "simple future." To provide the game with the locations of the clues, the creator may specify the following:

Clue coming from: Conjugations table→conjugated form
    Correct answer coming from: Tense table (Conjugations table→tense key)→tense in English The game may then assume that the non-correct answer choices should come from the same table and column as the correct answer.

After the game data is generated and stored in game data repository 238, a game-management apparatus 206 in online gaming framework 102 may create the online game using the game data. For example, game-management apparatus 206 may retrieve the game data from game data repository 238 and identify game template 208 and data set 210 from the game data. Game-management apparatus 206 may also obtain configuration options 212 and subsets 214 from the game data and instantiate the online game using configuration options 212 and data from subsets 214.

Game-management apparatus 206 may include the newly created online game in a set of online games 216 that can be played by users of online gaming framework 102. Game-management apparatus 206 may also maintain and/or provide a set of usage statistics 218 for the online game and/or other online games (e.g., online games 216). For example, game-management apparatus 206 may track an overall and/or average time spent on the online game, a number of users of the online game, a popularity of the online game (e.g., overall ranking, increasing popularity, decreasing popularity), a rating of the online game by players, and/or a set of high scores for the online game. Such game-based usage statistics may be stored with game data for the online game in game data repository 238 or in a separate repository of usage statistics. Game-management apparatus 206 may also track, for each user playing online games, a time spent on playing online games 216, specific online games played by the user, the user's top scores with online games 216, and/or the user's correct and incorrect answers provided during playing of online games 216. Such user-based usage statistics may be stored with user data (e.g., user data 1 222, user data z 224) in a user data repository 220 or in a separate repository of usage statistics.

Consequently, online gaming framework 102 may allow users to create online games 216 without requiring the users to manually input the data into game templates for online games 216. Instead, the data may be obtained from a data set that was previously created by the user and/or another user, thus allowing the data to be used with multiple online games 216. Such decoupling of data from online games 216 may additionally allow one set of users to focus on creating data sets and another set of users to focus on creating online games 216 using the data sets. Finally, changes to the data in the data set may be automatically propagated to the online games, which may further reduce the overhead associated with creating, maintaining, and/or updating online games 216.

Those skilled in the art will appreciate that the system of FIG. 2 may be implemented in a variety of ways. First, data-editing apparatus 202, game-editing apparatus 204, game-management apparatus 206, data set repository 226, template repository 232, game data repository 238, and user data repository 220 may be implemented as a single physical machine, multiple computer systems, one or more virtual machines, a grid, one or more databases, one or more filesystems, and/or a cloud computing system. Data-editing apparatus 202, game-editing apparatus 204, and game-management apparatus 206 may also be implemented together and/or separately by one or more hardware and/or software components and/or layers. Moreover, data-editing apparatus 202, game-editing apparatus 204, and game-management apparatus 206 may be accessed by a set of users through one or more interfaces (e.g., interface 112 of FIG. 1), such as GUIs, web-based user interfaces, and/or touch user interfaces.

Second, data-editing apparatus 202, game-editing apparatus 204, and game-management apparatus 206 may include functionality to create and use data sets of other formats. For example, data-editing apparatus 202 may be capable of creating data sets that are stored in graphs, and game-editing apparatus 204 and game-management apparatus 206 may allow users to create and play games using some or all of the data in the graphs.

Figure 3:
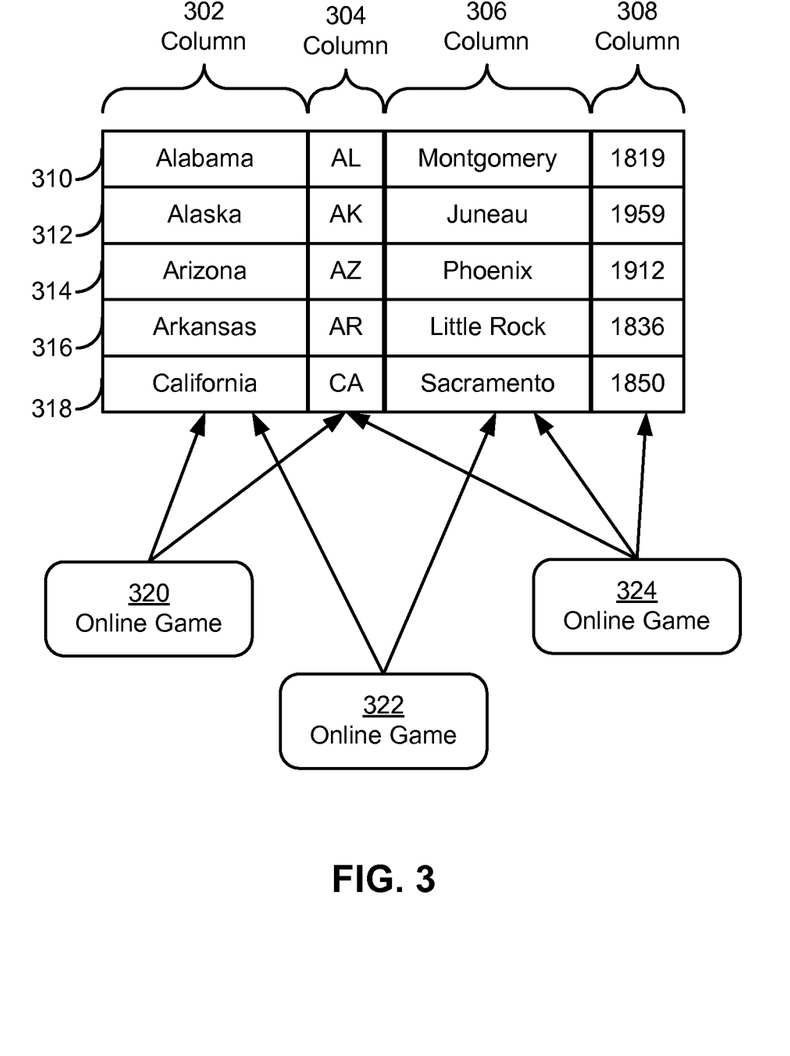
FIG. 3 shows the exemplary use of a data set with a set of online games in accordance with the disclosed embodiments.

FIG. 3 shows the exemplary use of a data set with a set of online games 320-324 in accordance with the disclosed embodiments. The data set includes four columns 302-308 and five rows 310-318. For example, column 302 may contain state names for states in the United States, column 304 may contain abbreviations of the state names, column 306 may contain state capitals of the states, and column 308 may contain years of statehood for the states. The data set may include additional columns (not shown), such as a column for images associated with rows 310-318 and one or more columns containing pixel coordinates of the images that correspond to data in one or more rows 310-318. For example, the data set may be a compound data set that additionally specifies a map of the United States and the pixel coordinates of each state capital Online game 320 may use data from columns 302-304, online game 322 may use data from columns 302 and 306, and online game 324 may use data from columns 304-308. As mentioned above, each online game 320-324 may include a column representing an item and one or more columns representing attributes of the item. For example, column 302 (e.g., state name) may identify the item used in online games 320-322, and columns 304-306 (e.g., abbreviation, capital) may specify attributes of the item in online games 320-322, respectively. Similarly, column 304 (e.g., abbreviation) may identify the item used in online game 324, and columns 306-308 (e.g., capital, year of statehood) may provide attributes of the item used in online game 324.

Because online games 320-322 use data from two columns, online games 320-322 may be matching games. For example, online games 320-322 may prompt users to match state names with abbreviations or capitals by turning over flashcards and/or dragging boxes containing state names to boxes containing abbreviations or capitals corresponding to the state names. Online games 320-322 may also be identification games that prompt users to identify a value from one column given the corresponding value from the other column. For example, online games 320-322 may show an item (e.g., state name) from column 302 as an item and ask the users to type the attribute (e.g., abbreviation, capital) corresponding to the item and/or select the attribute from a set of possible values. Alternatively, online games 320-322 may show the item's attribute and ask the user to type or select the item.

Unlike online games 320-322, online game 324 uses data from three columns 304-308 and may operate differently from online games 320-322. For example, online game 324 may ask the users to form groups of three boxes containing the state abbreviations, capitals, and years of statehood for each state represented by a row 310-318 in the data set. Online game 324 may also ask the users to order values in column 304 and/or column 306 by the numeric values in column 308. Finally, online game 324 may prompt the users to type a value from one column given a value from one of the other columns. The user may also be given the opportunity to view the value from the third column as an additional "clue" before typing the requested value. In other words, a variety of online games may be created from columns 302-308 and rows 310-318 of the same data set, and changes to the data set may automatically be propagated to online games 320-324 without requiring further configuration of online games 320-324 by users involved in creating online games 320-324.

Figure 4:
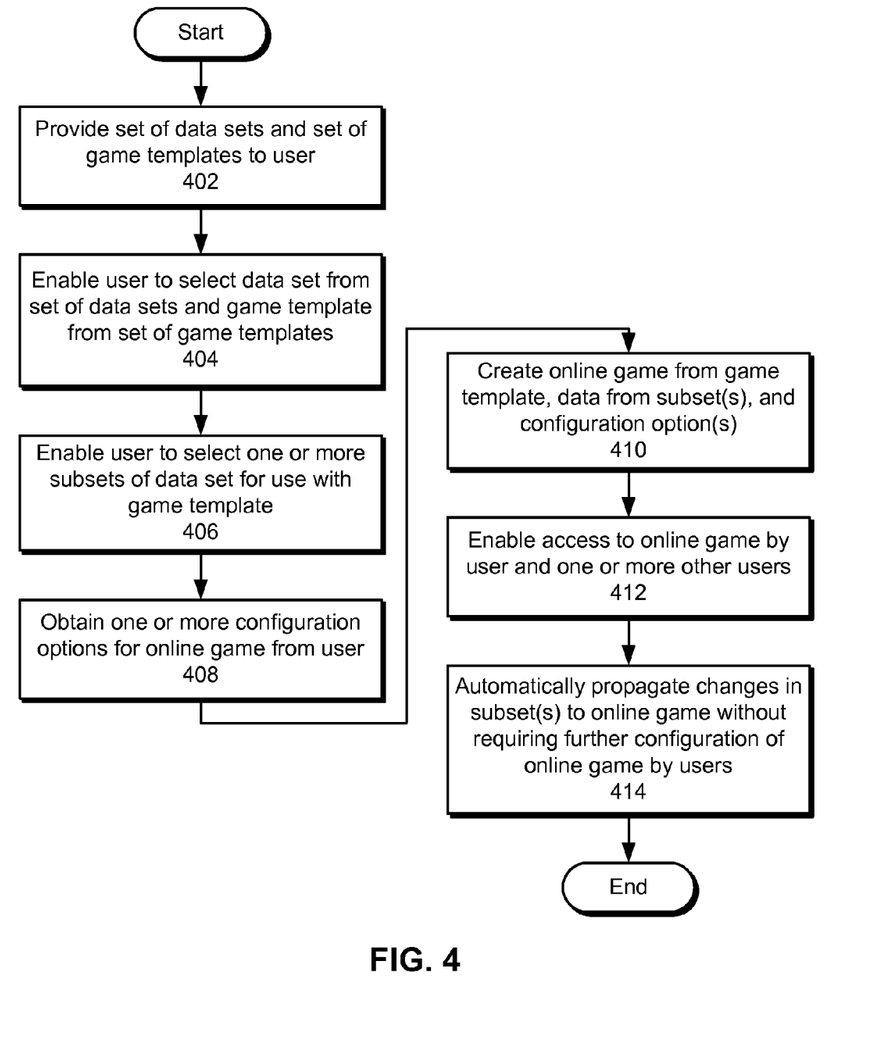
FIG. 4 shows a flowchart illustrating the process of facilitating creation of an online game in accordance with the disclosed embodiments.

FIG. 4 shows a flowchart illustrating the process of facilitating creation of an online game in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a data set and a game template for the online game are obtained. The data set may include a set of rows and a set of columns. The game template may be used to create a matching game, a categorization game, an ordering game, an identification game, and/or other type of game. To obtain the data set and game template, a set of data sets and a set of game templates are provided to a user (operation 402), and the user is enabled to select the data set from the set of data sets and the game template from the set of game templates (operation 404). Alternatively, the game template may be selected by the user after a default data set is obtained during creation and/or modification of the data set. Creation and modification of data sets is described in further detail below with respect to FIG. 5.

Next, the user is enabled to select one or more subsets of the data set for use with the game template (operation 406). The subset(s) (e.g., columns) may represent an item and one or more attributes of the item to be used with the online game. One or more configuration options for the online game are also obtained from the user (operation 408). The configuration options may include a title, a formatting option, and/or a game play option. The configuration options may also have default values if the user does not wish to provide any configuration options for the online game.

The online game is then created from the game template, data from the subset(s), and the configuration options (operation 410), and access to the online game by the user and one or more other users is enabled (operation 412). In particular, playing of the online game by the users may be enabled, and a set of usage statistics for the online game may be provided. The usage statistics may include a time spent, a number of users, a popularity, a score, a ranking, a correct answer, and/or an incorrect answer. Furthermore, changes in the subset(s) are automatically propagated to the online game without requiring further configuration of the online game by the users (operation 414). For example, changes to the data set may be automatically reflected in the online game the next time the online game is played because the online game operates as a "game layer" that obtains data from a "data layer" that contains the data set and is decoupled from the "game layer."

Figure 5:
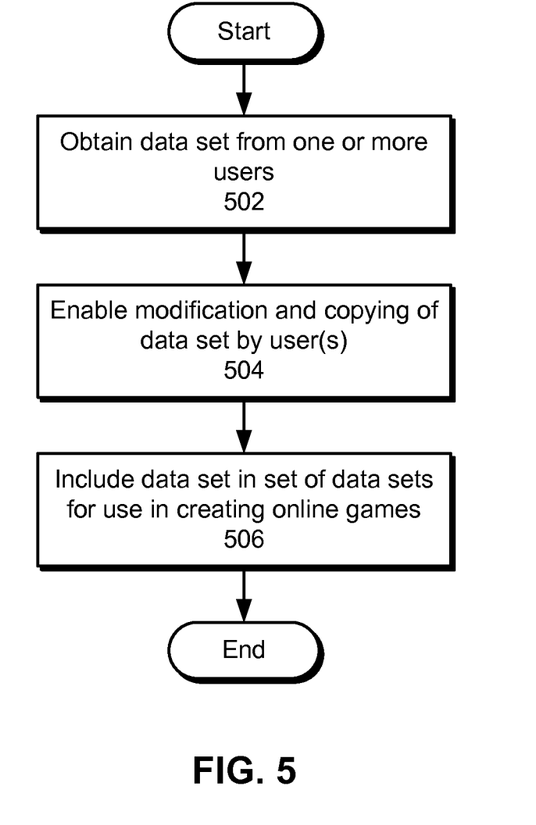
FIG. 5 shows a flowchart illustrating the process of creating a data set in accordance with the disclosed embodiments.

FIG. 5 shows a flowchart illustrating the process of creating a data set in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, the data set is obtained from one or more users (operation 502). For example, the data set may be obtained through a user interface for editing a set of rows and a set of columns in the data set. Next, modification and copying of the data set by the user(s) is enabled (operation 504). For example, the user who created the data set may be allowed to modify the data set, while other users may copy the data set into new versions of the data set and modify the new versions. Finally, the data set is included in a set of data sets for use in creating online games (operation 506). A user may then select the data set and one or more columns in the data set for use with a game template during creation of the online game, as described above.

Figure 6:
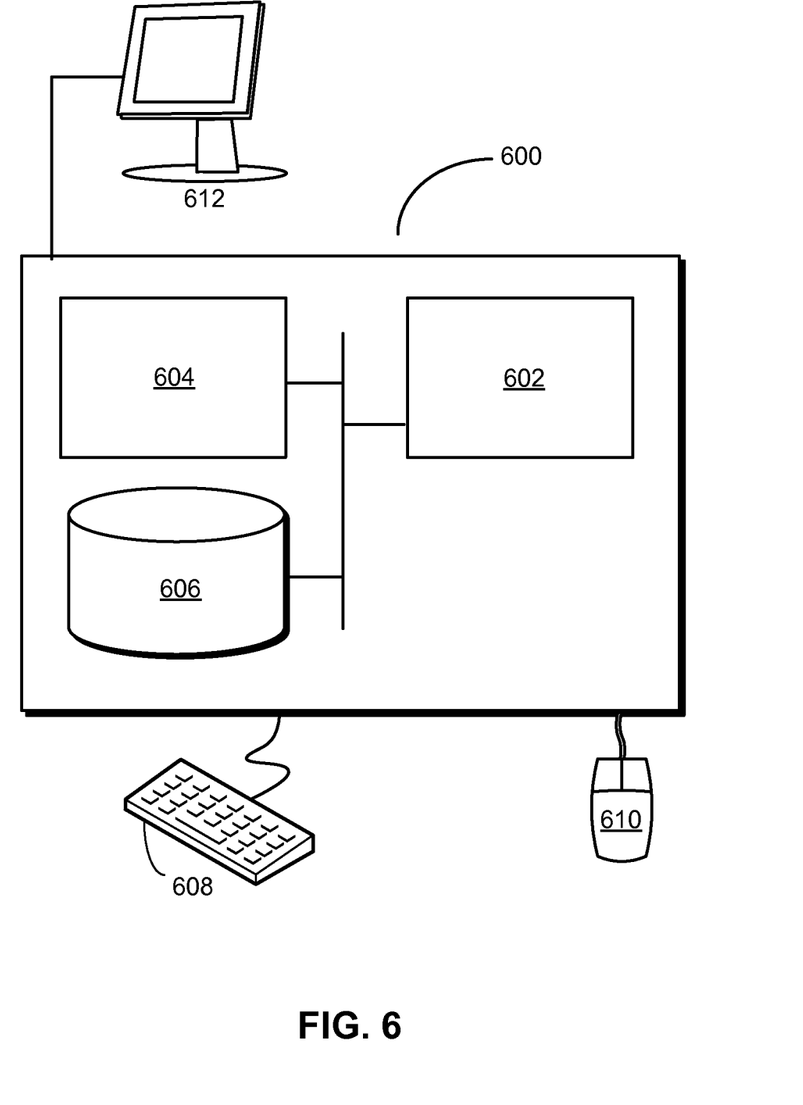
FIG. 6 shows a computer system in accordance with the disclosed embodiments.

FIG. 6 shows a computer system 600 in accordance with an embodiment. Computer system 600 may correspond to an apparatus that includes a processor 602, memory 604, storage 606, and/or other components found in electronic computer systems. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, FIG. 6 provides a system for facilitating creation of an online game. The system may include a game-editing apparatus that obtains a data set and a game template for the online game and enables a user to select one or more subsets of the data set for use with the game template. The system may also include a game-management apparatus that creates the online game from the game template and data from the subset(s) without requiring manual input of the data into the game template by the user. Finally, the system may include a data-editing apparatus that obtains the data set from the user or one or more other users and enables modification and copying of the data set by the user or the one or more other users.

In addition, one or more components of computer system 600 may be remotely located and connected to the other components over a network. Portions of the present embodiments (e.g., game-editing apparatus, game-management apparatus, data-editing apparatus, etc.) may also be located on different nodes of a distributed system that implements the embodiments. For example, the present embodiments may be implemented using a cloud computing system that allows a set of remote users to create online games using game templates and data sets and/or play the online games.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating creation of an online game, comprising:
    obtaining a data set and a game template for the online game from an online gaming framework, wherein the data set comprises a list of items and corresponding attributes for each item in the list of items, wherein the game template comprises a set of game mechanics for implementing the game, and wherein the data set and the game template are independent;
    enabling, at the online gaming framework, a user to select one or more subsets of the data set for use with the game template; and
    creating, at the online gaming framework, the online game from the game template and data from the one or more subsets without requiring manual input of the data into the game template by the user, wherein the online gaming framework enables the efficient reuse of data sets and game templates for the creation of new games.

2. The computer-implemented method of claim 1, wherein obtaining the data set and the game template for the online game involves:
    providing a set of data sets and a set of game templates to the user; and
    enabling the user to select the data set from the set of data sets and the game template from the set of game templates.

3. The computer-implemented method of claim 1, further comprising:
    obtaining one or more configuration options for the online game from the user; and
    including the one or more configuration options in the online game.

4. The computer-implemented method of claim 3, wherein the one or more configuration options comprise at least one of:
    a title;
    a formatting option; and
    a game play option.

5. The computer-implemented method of claim 1, further comprising:
    obtaining the data set from the user or one or more other users; and
    enabling modification and copying of the data set by the user or the one or more other users.

6. The computer-implemented method of claim 5, wherein the data set is obtained through a user interface for editing a set of rows and a set of columns in the data set.

7. The computer-implemented method of claim 1, further comprising:
    enabling access to the online game by the user and one or more other users; and automatically propagating changes in the one or more subsets to the online game without requiring further configuration of the online game by the user or the one or more other users.

8. The computer-implemented method of claim 7, wherein enabling access to the online game by the user and the one or more other users involves at least one of:
    enabling playing of the online game by the user and the one or more other users; and
    providing a set of usage statistics for the online game.

9. The computer-implemented method of claim 8, wherein the set of usage statistics comprises at least one of:
    a time spent;
    a number of users;
    a popularity;
    a score;
    a ranking;
    a correct answer; and
    an incorrect answer.

10. The computer-implemented method of claim 1, wherein the data set is associated with at least one of:
    a set of rows and a set of columns;
    a key and a set of values related to the key;
    a compound data format; and
    a relational model.

11. A system for facilitating creation of an online game, comprising:
    a game-editing apparatus configured to:
        obtain a data set and a game template for the online game from an online gaming framework, wherein the data set comprises a list of items and corresponding attributes for each item in the list of items, wherein the game template comprises a set of game mechanics for implementing the game, and wherein the data set and the game template are independent; and
        enable a user to select, at the online gaming framework, one or more subsets of the data set for use with the game template; and
    a game-management apparatus configured to create the online game, at the online gaming framework, from the game template and data from the one or more subsets without requiring manual input of the data into the game template by the user, wherein the online gaming framework enables the efficient reuse of data sets and game templates for the creation of new games.

12. The system of claim 11,
    wherein the game-editing apparatus is further configured to obtain one or more configuration options for the online game from the user, and
    wherein the game-management apparatus is further configured to include the one or more configuration options in the online game.

13. The system of claim 11, further comprising:
    a data-editing apparatus configured to:
        obtain the data set from the user or one or more other users; and
        enable modification and copying of the data set by the user or the one or more other users.

14. The system of claim 11, wherein the game-management apparatus is further configured to:
    enable access to the online game by the user and one or more other users; and
    automatically propagate changes in the one or more subsets to the online game without requiring further configuration of the online game by the user or the one or more other users.

15. The system of claim 14, wherein enabling access to the online game by the user and the one or more other users involves at least one of:
    enabling playing of the online game by the user and the one or more other users; and
    providing a set of usage statistics for the online game.

16. A non-transitory computer-readable storage medium storing instructions that when executed by a computer cause the computer to perform a method for facilitating creation of an online game, the method comprising:
    obtaining a data set and a game template for the online game from an online gaming framework, wherein the data set comprises a list of items and corresponding attributes for each item in the list of items, wherein the game template comprises a set of game mechanics for implementing the game, and wherein the data set and the game template are independent;
    enabling, at the online gaming framework, a user to select one or more subsets of the data set for use with the game template; and
    creating, at the online gaming framework, the online game from the game template and data from the one or more subsets without requiring manual input of the data into the game template by the user, wherein the online gaming framework enables the efficient reuse of data sets and game templates for the creation of new games.

17. The non-transitory computer-readable storage medium of claim 16, the method further comprising:
    obtaining one or more configuration options for the online game from the user; and
    including the one or more configuration options in the online game.

18. The non-transitory computer-readable storage medium of claim 16, the method further comprising:
    obtaining the data set from the user or one or more other users; and
    enabling modification and copying of the data set by the user or the one or more other users.

19. The non-transitory computer-readable storage medium of claim 16, the method further comprising:
    enabling access to the online game by the user and one or more other users; and
    automatically propagating changes in the one or more subsets to the online game without requiring further configuration of the online game by the user or the one or more other users.

20. The non-transitory computer-readable storage medium of claim 19, wherein enabling access to the online game by the user and the one or more other users involves at least one of:
    enabling playing of the online game by the user and the one or more other users; and
    providing a set of usage statistics for the online game.

* * * * *